March 24, 1931.  J. J. LA SPISA  1,797,727

DISPENSING DEVICE

Filed June 28, 1929

Inventor
Joseph J. La Spisa
By his Attorneys
Kenyon & Kenyon

Patented Mar. 24, 1931

1,797,727

UNITED STATES PATENT OFFICE

JOSEPH J. LA SPISA, OF NEW YORK, N. Y.

DISPENSING DEVICE

Application filed June 28, 1929. Serial No. 374,333.

My invention relates to improvements in devices for dispensing commodities which are sold in collapsible receptacles.

The particular object of my invention is to provide a simple, effective and inexpensive device for dispensing tooth paste or shaving cream from collapsible tubes, which is at once a holder for the tube containing it, and a means for supplying the quantity of cream or paste desired.

The invention consists substantially of a slotted tubular member having means for securing it to a suitable place for use, in combination with a smaller tubular member, similarly slotted, fitting within the other, the two cooperating in the way described hereinafter to accomplish the object sought.

In the drawings forming part hereof, and in which similar reference numerals refer to corresponding parts, Figure 1 is a front view of my novel device with a tube of cream attached thereto;

Figure 1:
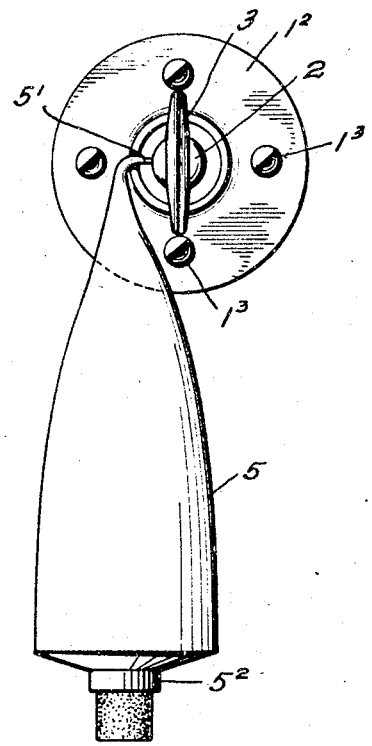
Figure 2:
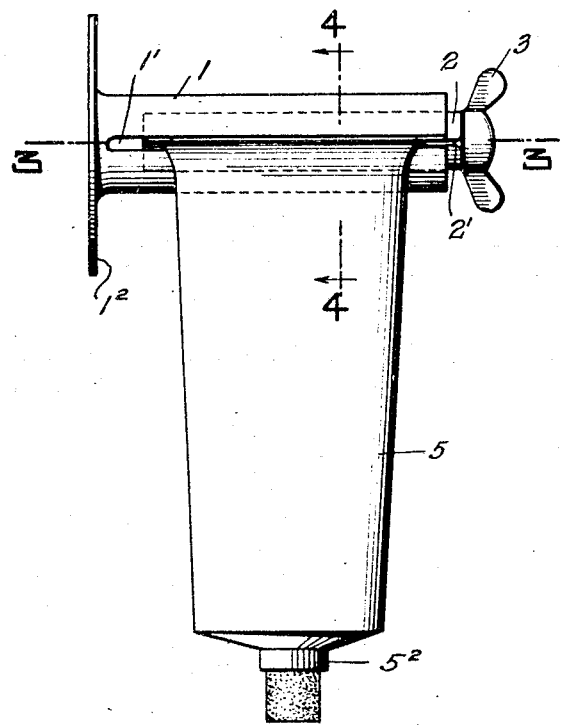
Figure 2 is a side view thereof.
Figure 3:
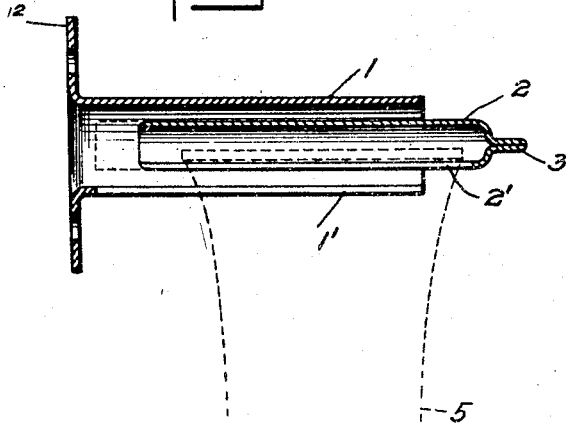
Figure 3 is a section on the line 3—3 of Fig. 2.
Figure 4:
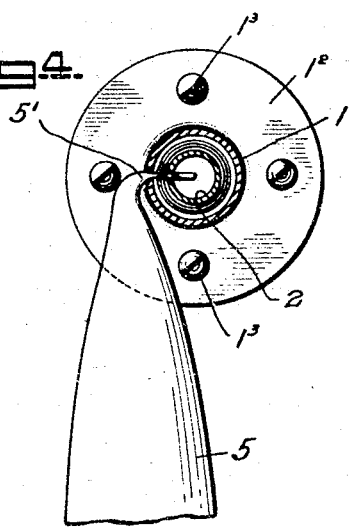
Figure 4 is a section on the line 4—4 of Fig. 2.

Referring to the drawings, the numeral 1 designates the outer tubular member. It is provided with a slot 1', and a base or plate $1^2$, for attaching it by means of screws $1^3$ to a convenient place for use. Within this outer member is positioned a smaller tubular member 2, also slotted as shown at 2', which slot may be narrower than the slot 1'. The closed end of member 2 is preferably equipped with a winged nut 3. The circumference of this inner member must be such that ample room is provided between it and the inside circumference of the outer member to allow for the winding on the inner member of the complete tube mounted in the device as the paste or cream is exhausted from it in use.

In practice my novel device operates as follows. A tube of paste or cream, such as 5, is mounted in the device by thrusting its crimped or flattened end 5' through slots 1' and 2' and turning the member 2 slightly by means of winged nut 3. This will suffice to hold tube 5 pendent from the device, and ready for use at any time on the cap of the tube (not shown) being removed. When the tube is exhausted wholly of its contents and entirely wrapped around or wound on the member 2, (with the exception of the seat $5^2$ for the cap), the member 2 is withdrawn from the member 1, and on being stripped of the used tube it carries, is again ready for use.

The efficiency of my device and the economy resulting from its use, are obvious.

It will be evident that various changes may be made in my construction without affecting its operation. The outer member, for instance, need not be round, and it is not absolutely necessary that the inner member be hollow, or have a slot extending the whole of its length. I do not, therefore, limit myself to the exact construction shown and described, as various changes may be made therein without departing from the spirit of the invention, or the scope of the claims appended hereto.

What I claim as new and desire to secure by Letters Patent is:

1. In a dispensing device of the character described, a hollow member having a slot therein open at its outer end, a second member with a slot therein, the last named member adapted to hold the end of a collapsible tube inserted through the slot in the hollow member and to revolve within the said hollow member to eject the contents of said tube in varying quantities, the space between the external surface of the second member and the inner surface of the hollow member being of such proportions as to provide ample room for the flattened end of said tube to be wound about the second member without interfering with its rotary function, the second member being adapted to be withdrawn from the hollow member with the exhausted tube wound thereon, substantially as described.

2. In a dispensing device of the character described, a hollow member having a slot therein open at its outer end, a second hollow member with a slot therein, means on the first hollow member for fastening it in stationary position, the second hollow member being revoluble within the first and adapted to hold within its said slot the end of a collapsible tube passed through the slot in the first named hollow member, and, through its revolution within the said first named member, to wind upon itself the collapsed part of the tube as the content thereof is ejected, the space between the external surface of the second member and the inner surface of the hollow member being sufficient to allow the flattened end of said tube to be wound about the second member without interfering with its rotary function, the second member being adapted to be withdrawn from the hollow member with the exhausted tube wound on it, substantially as described.

3. In a device of the character described, the combination of two members, one fitting within the other, each provided with a slot, the slot in the outer member being open at through the end of a collapsible tube, the slot in the inner member adapted to receive therein the said end, the contents of said collapsible tube being ejected on the revolution of said inner member, the concentric space between the external surface of the inner member and the inner surface of the outer member being of such proportions as to provide ample room for the flattened end of the tube wound about the inner member without interfering with its rotary function, and the inner member adapted to be withdrawn from the outer member with the exhausted tube wound thereon, substantially as described.

4. In a device of the character described, a hollow member having therein a slot open at its outer end, a second member having means for holding the end of a collapsible tube inserted through the said slot, said second member adapted to be revolved within the hollow member to eject the contents of said tube in varied quantities, the space between the external surface of the second member and the inner surface of the hollow member being of such proportions as to provide ample room for the flattened end of the tube wound about the second member without interfering with its rotary function, and the second member adapted to be withdrawn from the hollow member with the exhausted tube wound thereon substantially as described.

In testimony whereof, I have signed my name to this specification.

JOSEPH J. LA SPISA.

CERTIFICATE OF CORRECTION.

Patent No. 1,797,727.  Granted March 24, 1931, to

JOSEPH J. LA SPISA.

It is hereby certified that error appears in the printed specification of the above numbered patent requiring correction as follows: Page 2, line 19, claim 3, after the word "at" insert the words its outer end and adapted to receive there; and that the said Letters Patent should be read with this correction therein that the same may conform to the record of the case in the Patent Office.

Signed and sealed this 28th day of April, A. D. 1931.

(Seal)

M. J. Moore,
Acting Commissioner of Patents.